US006404423B1

(12) United States Patent

Kivelä et al.

(10) Patent No.: US 6,404,423 B1

(45) Date of Patent: Jun. 11, 2002

(54) METHOD FOR DISPLAY POWER MANAGEMENT AND MONITOR EQUIPPED WITH A POWER MANAGEMENT FUNCTION

(75) Inventors: Seppo Kivelä ; Kari Vigelius, both of Salo (FI)

(73) Assignee: Nokia Display Products Oy, Salo (FI)

( * ) Notice: Subject to any disclaimer, the term of this patent is extended or adjusted under 35 U.S.C. 154(b) by 0 days.

(21) Appl. No.: 09/350,607

(22) Filed: Jul. 9, 1999

(51) Int. Cl.[7] .............................. G09G 5/00; G06F 1/32

(52) U.S. Cl. ........................................ 345/212; 713/323

(58) Field of Search ................................. 345/211, 212, 345/213, 214; 713/300, 310, 320, 321, 323, 324, 330, 340

(56) References Cited

U.S. PATENT DOCUMENTS 5,513,359 A * 4/1996 Clark et al. ................. 713/323
5,576,738 A * 11/1996 Anwyl et al. ............... 345/212
5,617,572 A * 4/1997 Pearce et al. ............... 713/323
5,675,364 A * 10/1997 Stedman et al. ............ 345/212
5,738,873 A * 4/1998 Hwang ........................ 327/41
5,745,105 A * 4/1998 Kim ........................... 345/212
5,808,693 A * 9/1998 Yamashita et al. .......... 348/554
5,880,719 A * 3/1999 Kikinis ....................... 345/212
5,886,689 A * 3/1999 Chee et al. ................. 345/211
5,917,479 A * 6/1999 Haapakoski ................ 345/211
5,919,263 A * 7/1999 Kikinis et al. .............. 713/320
6,006,335 A * 12/1999 Choi et al. .................. 713/310
6,020,879 A * 2/2000 Nakabayashi ............... 345/212
6,092,209 A * 7/2000 Holzhammer et al. ...... 713/324
6,237,102 B1 * 5/2001 Lee ............................ 713/323

OTHER PUBLICATIONS

VESA DPMS Standard, "Display Power Management Signaling (DPMS) Standard", Version 1.0, Aug. 20, 1993, Video Electronics Standards Assoc. (VESA), San Jose CA.
"Advanced Power Management—The Next Generation", VESA 000736, Version 1.0, Intel Corp. & Microsoft Corp. Mar. 2, 1992.
Advanced Power Management (APM) BIOS Interface Specification, Rev. 1.2, Feb. 1996, Intel Corp & Microsoft Corp.

* cited by examiner

*Primary Examiner*—Steven Saras
*Assistant Examiner*—Paul Bell
(74) *Attorney, Agent, or Firm*—Ware, Fressola, Van Der Sluys & Adolphson LLP

(57) ABSTRACT

Control of display power management by a host computer connected by a standard cable to a display monitor can be avoided by simply detecting user inactivity within a monitor or signaling such to the monitor with any one of the DPMS signals to the monitor, such as the video signal, i.e., the video intelligence signal occurring between horizontal synchronization pulses. In the absence of the video signal, the monitor commences timing of several display power management states without further reference to the DPMS signaling signals, except to monitor whether the video signal returns to normal. In the absence of a return to normal on the video signal, the display monitor transitions from a normal state to a standby state, thence to a suspend state, and finally to an off state. If user activity is again detected, a transition from any of these display power management states to normal is made.

11 Claims, 8 Drawing Sheets

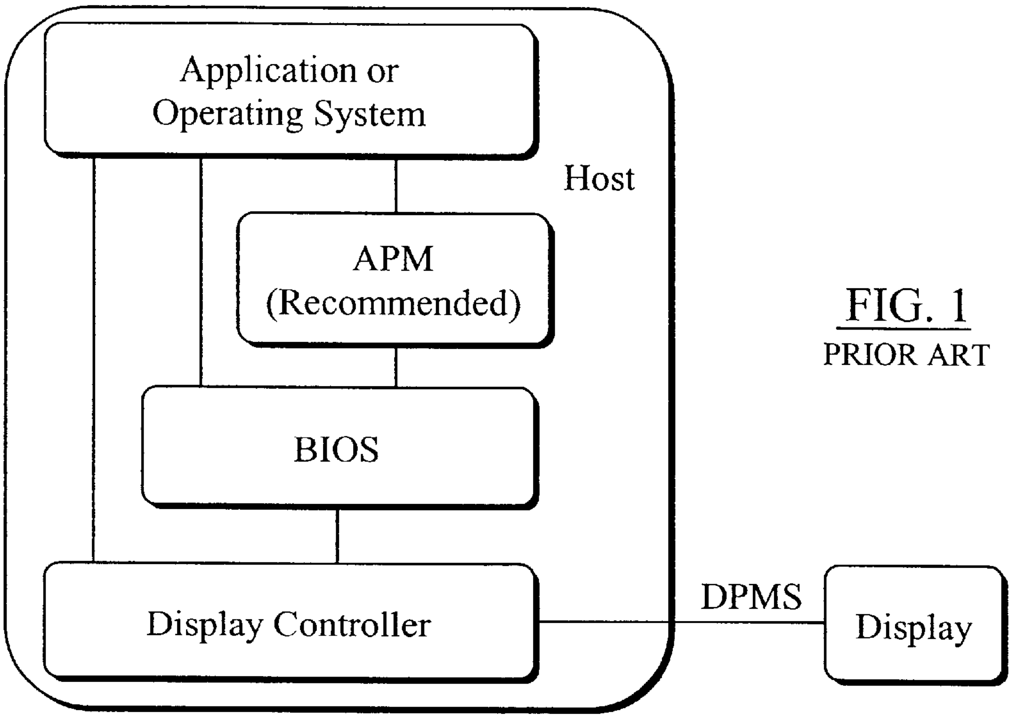
FIG. 1
PRIOR ART
FIG. 3
PRIOR ART
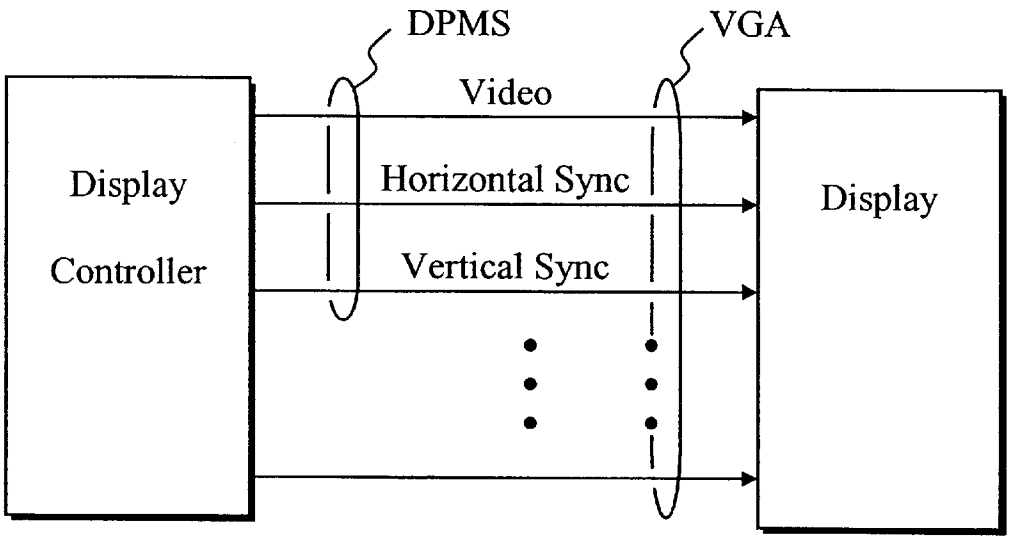

| State | Signals | | | DPMS Compliance Requirement | Power Savings | Recovery Time |
|---|---|---|---|---|---|---|
| | Horizontal | Vertical | Video | | | |
| On | Pulses | Pulses | Active | Mandatory | None | Not Applicable |
| Stand-by | No Pulses | Pulses | Blanked | Optional | Minimal | Short |
| Suspend | Pulses | No Pulses | Blanked | Mandatory | Substantial | Longer |
| Off | No Pulses | No Pulses | Blanked | Mandatory | Maximum | System Dependent |

FIG. 5
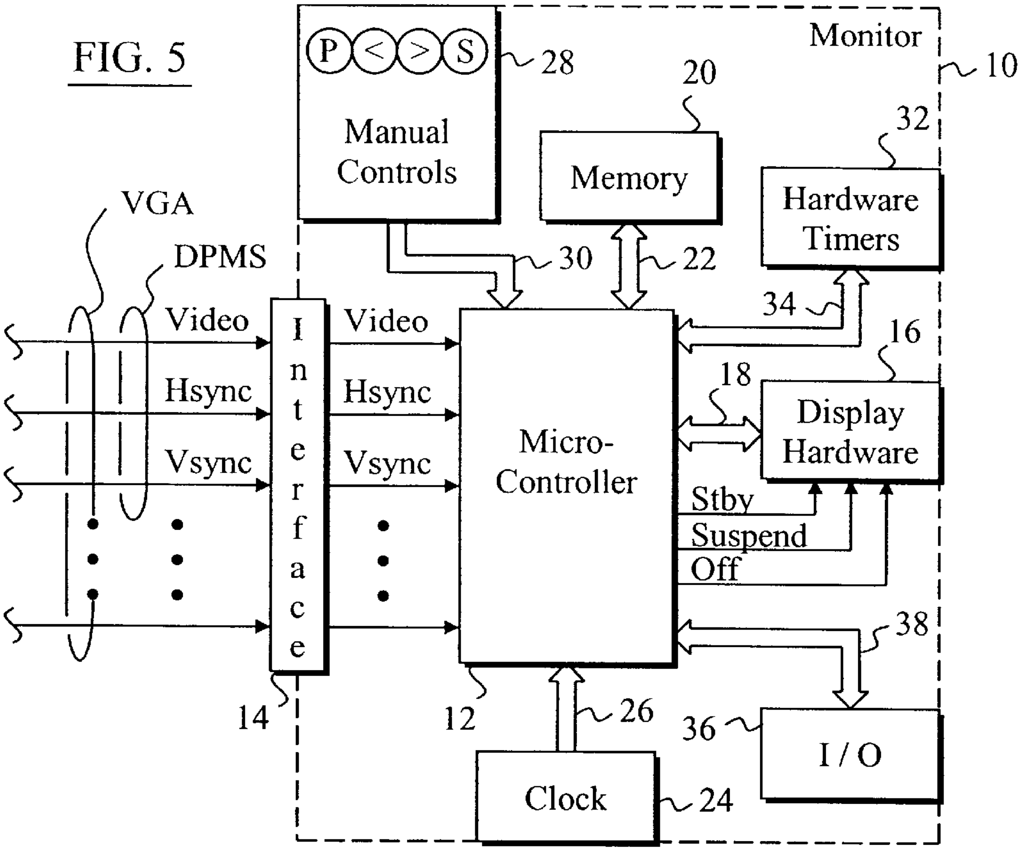
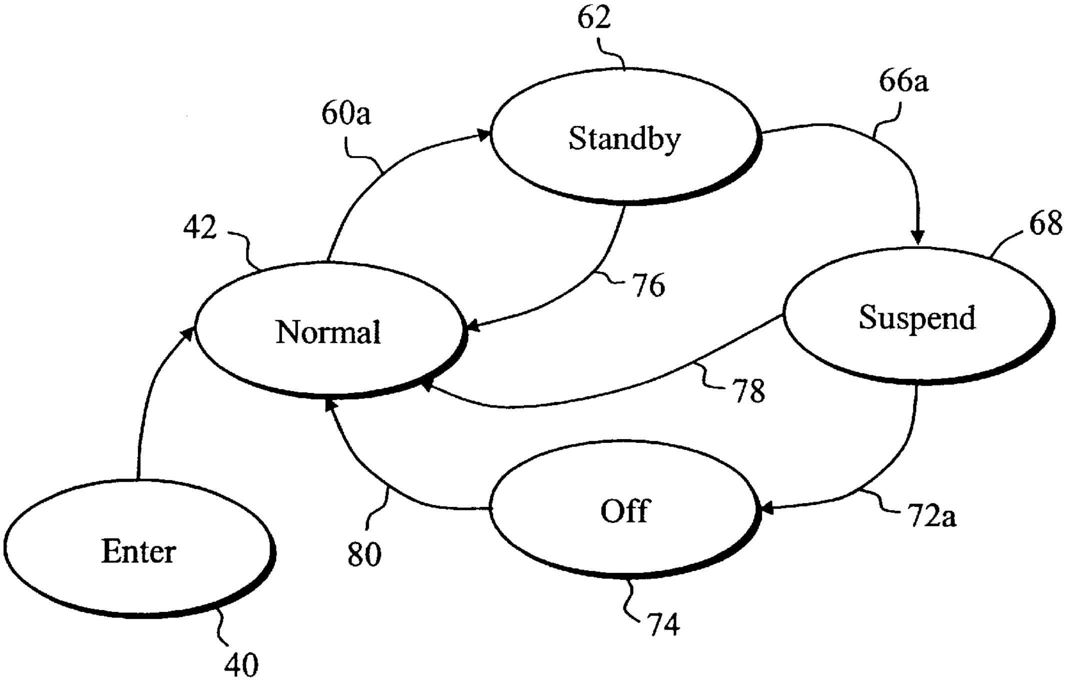
FIG. 6

METHOD FOR DISPLAY POWER MANAGEMENT AND MONITOR EQUIPPED WITH A POWER MANAGEMENT FUNCTION

BACKGROUND OF THE INVENTION

1. Technical Field

The present invention relates to a power management function for a monitor.

2. Discussion of Related Art

These days, monitors are equipped with a power management function standardized according to an accepted standard, i.e., the Display Power Management Standard (DPMS) of the Video Electronics Standards Association (VESA). If the computer is left idle, it signals the monitor to gradually reduce power consumption to a fraction of the normal consumption.

The computer signals the monitor to assume various DPMS states, including full on, standby, suspend and off. In the 'on' state, there are no power savings, in 'standby' the power savings are minimal, in 'suspend' state, the power savings are substantial, and in the 'off' state, the power savings are maximum. VESA adapted guidelines from an advanced power management (APM) specification created by Microsoft and Intel that provides an environment for power management of laptop computers by the system BIOS, operating system or applications, as shown in FIG. 1, taken from the VESA DPMS Standard. For instance, the BIOS can define several states, as shown in FIG. 2, taken from the Intel/Microsoft APM Specification. Transitions between these APM states result in calls to the display controller of FIG. 1, which in turn provides the DPMS hardware signaling defined by the VESA standard, as shown in FIG. 4. FIG. 3 shows a typical VGA cable extending between a host computer's display controller and a display monitor, with numerous individual signal lines within the standard VGA cable. Only three of those lines are shown labeled in FIG. 3, since those are the only ones relevant to the VESA DPMS standard, i.e., video, horizontal synchronization, and vertical synchronization. Although shown as single lines, as will be appreciated by those of skill in the art, these signals are actually carried out on more than one line each. The display controller causes these signal lines to assume different signaling states according to the table shown in FIG. 4, as defined by the VESA DPMS standard. For instance, energy savings for a 130 watt monitor would be a few watts (e.g., down to <90W) at the 'standby' level, a very significant number of watts at the 'suspend' level (e.g., down to 10W), and perhaps a hundred watts or more representing almost, or even a complete, power shutdown (e.g., down to 5W).

A problem with the VESA DPMS standard is that, depending on the individual setup, it can involve equipment from numerous different vendors, all of which must interface with each other in a way as to signal and recognize the various states and to actually execute the VESA DPMS states in a way that works properly. Unfortunately, there are often mismatches between implementations that do not take into account peculiarities of different vendors' implementations. This can cause a computer user to become frustrated, because the DPMS standard is not working properly, and he is not sure whether it is the fault of the computer or the display. Many times, the user will wrongly conclude that it is the display that is the problem, when it is really the display controller in the host, or the operating system of the host itself. This can lead to unnecessary trouble-shooting and much annoyance.

SUMMARY OF INVENTION

According to a first aspect of the invention, a display power management method comprises the steps of monitoring at a monitor a signal indicative of user activity, and timing within said monitor, for so long as said signal indicates user inactivity, successive periods of user inactivity, for initiating a corresponding series of successive greater power saving states, each of which terminates to a normal power consuming state upon detection of resumption of user activity as indicated by said signal or equivalently by some other similar signal indicative of user activity.

According further to the first aspect of the invention, the step of monitoring comprises repeatedly sensing or detecting in a display for the absence of any one of a plurality of signals provided to the display from a host computer over a standard interface cable for signaling various display power management states, and the step of timing further comprises the steps of upon first detecting the absence of any one of said plurality of signals while in a normal operating state, commencing a timing procedure while continuing to detect for said absence of said any one of said plurality of signals, whereby after a number of timeout periods energy consumption of said display is reduced in a comparable number of energy-saving operating states, and returning to said normal operating state upon no longer detecting said absence of said any one of said plurality of signals.

According still further to the first aspect of the invention, the number of energy-saving operating states includes a standby state with minimal power savings, a suspend state with substantial power savings, and an off stage with maximum power savings.

Still further according to the first aspect of the invention, upon said first detecting the absence of said any one of said plurality of signals, transitioning after a standby timeout period from a normal operating state of said display to a standby operating state with minimal power savings starting a suspend timeout period upon transitioning to said standby operating state, transitioning after said suspend timeout period to a suspend operating state, starting an off timeout period upon transitioning to said suspend operating state, transitioning after said off timeout period to an off operating state.

According to a second aspect of the invention, a monitor having a controller for receiving standard signals from a host computer for displaying information with display hardware further comprises a detector for detecting absence of any one of a plurality of display power management signals among said standard signals from said host computer, and a timer for timing transitions to a plurality of energy-saving states subsequent to said detecting the absence of said any one of the plurality of display power management signals for providing state transition timeout signals, wherein said display hardware is responsive to said state transition timeout signals for transitioning to said plurality of energy-saving states.

In further accord with the second aspect of the invention, the monitor further comprises manual controls for user selection of timeout periods for said timing of said transitions to said plurality of energy saving states.

These and other objects, features and advantages of the present invention will become more apparent in light of the detailed description of a best mode embodiment thereof, as illustrated in the accompanying drawing.

BRIEF DESCRIPTION OF THE DRAWINGS

FIG. 1 shows a prior art illustration of the display power management system (DPMS) architecture for a personal computer example.

FIG. 3 shows a prior art standard VGA interface between the display controller of a host computer and a display, particularly showing display power management system (DPMS) signals by which the host signals the display to assume various power saving states.

FIG. 5 shows a monitor for assuming display power management states, according to the present invention, upon detecting or receiving an indication of user inactivity.

FIG. 6 shows a state machine diagram illustrating various power saving states which the monitor of FIG. 5 may assume.

DETAILED DESCRIPTION OF PREFERRED EMBODIMENTS

Figures 2, 4:
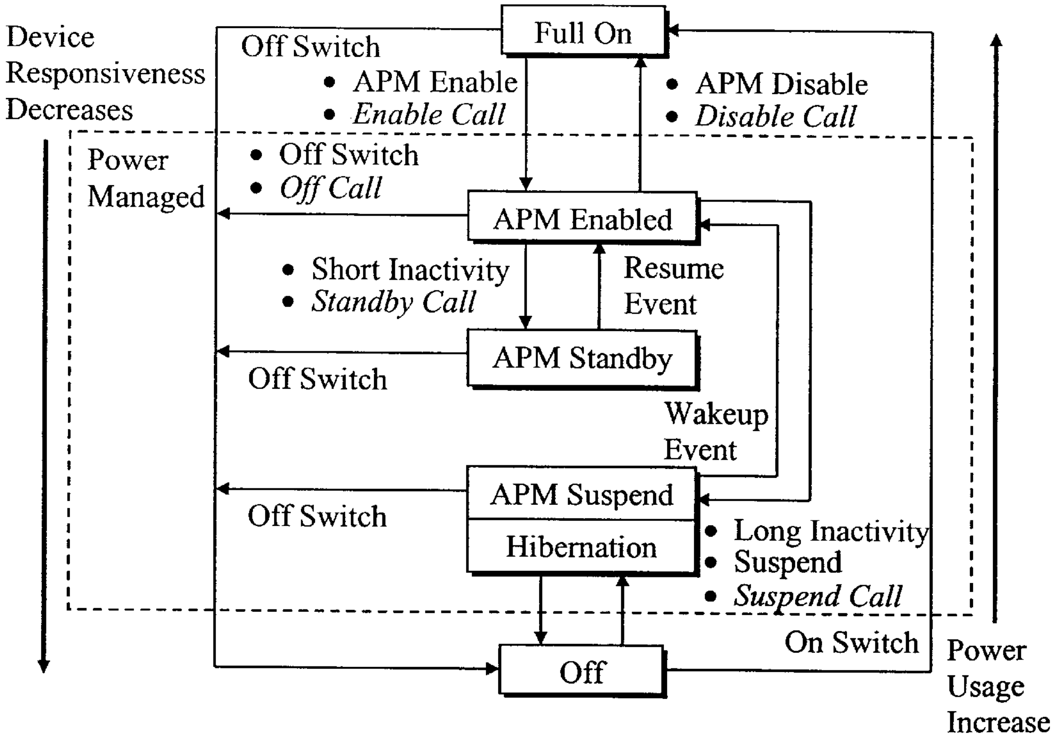
FIG. 4 PRIOR ART
FIG. 2 PRIOR ART
FIG. 2 shows a prior art illustration of advanced power management (APM) system state transitions.
FIG. 4 shows a prior art display power management summary.

FIG. 5 shows a monitor 10 having a controller 12 for receiving standard Video Graphic Adapter (VGA) signals from the display controller of a host computer. Among the standard signals are video, horizontal synchronization, and vertical synchronization signals which are to be used for host signaling to the monitor according to the Display Power Management Standard (DPMS) of the Video Electronics Standards Association (VESA). All of these signals are received at an interface 14 and passed to the controller 12 which may be a microcontroller. The purpose of the monitor, of course, is to display information with well-known display hardware 16, which is, for instance, in communication with the microcontroller on plural lines 18. The monitor 10 may also include a memory 20 connected to the controller 12 by a plurality of lines 22, a clock 24 for providing a clock signal on a line 26 to the controller, manual controls 28 which may be a series of push-buttons on the front panel of the monitor for use by the user, and which may include a series of buttons which each provides a separate signal on a plurality of lines 30 to the controller 12. The monitor 10 may also include hardware timers 32 for timing out events in accordance with timing initiation signals received from the controller 12 on one or more of a plurality of lines 34, and for signaling the end of timeout periods to the controller. The controller may instead include software timers, as discussed below.

As can be seen from FIG. 5, each of the DPMS signals is provided to the microcontroller for purposes of the ordinary display of information on the display hardware 16. However, instead of monitoring all these signals as dictated by the VESA DPMS standard, and reducing power according to the signaling thereof, the present invention teaches to avoid using all, or even any, of these signals to comply with the DPMS standard. For instance, one way would be to monitor any one, but only one, of the DPMS signals, preferably the video signal. The other two signals, e.g., the horizontal and vertical synchronization signals are, for purposes of DPMS, ignored. This is not to say that these other two signals may not be simultaneously monitored for other purposes. But, for purposes of DPMS standard, wherein multiple energy-saving states are required for compliance, the present invention teaches that it is not necessary to monitor all, or even any, of these signals. For another example, it is only necessary to monitor two of these signals, i.e., lack of horizontal synchronization pulses to indicate user inactivity, as indicated by the host signaling a standby state, and both vertical synchronization and horizontal synchronization pulses being present to indicate the presence of user activity. In such an embodiment, only the horizontal synchronization signal would be used to initiate a series of timers within the monitor itself, without further reference to the status of the DPMS signals, except for the presence of both horizontal and vertical synchronization signals indicating return to normal user activity.

According to the present invention, the monitor 10 includes a stored computer program which may be stored in the memory 20 or in an on-board memory (not shown) of the microcontroller 12, which program executes a sequence of steps such as illustrated by the state diagram of FIG. 6 or the flowchart of FIGS. 9A–9D for complying with the DPMS requirements without having to pay attention to the signaling of the various DPMS signals on the VGA cable from the host computer. The only thing that needs to be heeded is the status of the selected signal, such as the video signal which is sufficient to indicate user inactivity, e.g., whether the host computer has initiated screen blanking, DPMS, or whether there is some other indication of user inactivity that can be deduced from one of the VGA signals.

It should also be realized that the monitor can be set up to respond to one or more of the standard DPMS signals, but in a different way than contemplated by the VESA DPMS Standard. For instance, the monitor can be set up to respond only to the first, standby command, as indicated by no horizontal pulses in the presence of vertical pulses, and without any reference to whether the video signals are active or blanked. In that case, the monitor could immediately enter into a standby state with minimal power savings and begin a suspend timer without any further reference to vertical sync pulses disappearing while horizontal pulses return, as indicated for initiating the suspend state according to the DPMS Standard. Similarly, if the suspend state were timed out, and a transition made to the substantial power savings of the suspend state, an off-state timer would then commence, and an off-state entered into with maximum power savings after timeout, without any reference to whether or not both horizontal and vertical sync signals were absent. With such an embodiment, it would only be necessary to monitor for the absence of horizontal sync pulses to initiate the DPMS compliant routine within the monitor and for the presence of both horizontal and vertical sync signals for terminating energy-saving states and returning to normal.

It should also be realized that the present invention is not necessarily dependent upon any of the DPMS signals at all, and may instead utilize some other signal indication of user inactivity, such as another signal provided on the VGA cable, or via an input/output (I/O) port 36, and provided to the controller 12 by means of one or more of a plurality of signal lines 38. It should also be realized that the monitor itself may include means or computer program methodology for detecting user inactivity. These may include monitoring any one or more of the VGA signals, monitoring by means of a motion sensor or the like, means for comparing successive video frames for change/no change, or any of many other different conceivable indicators of user inactivity.

FIG. 6 shows a state diagram for use in the monitor 10 of FIG. 5 in carrying out one embodiment of the display power management method of the present invention. The state diagram of FIG. 6 assumes that user inactivity is constantly being monitored in the background, e.g., by repeatedly detecting in the display for the absence of the selected "any one" of the plurality of DPMS signals provided to the display from the host computer over the VGA interface cable for signaling various display power management states. For instance, it could be that the video signal is monitored, and the horizontal synchronization and vertical synchronization signals are ignored. Or, it could be that the horizontal sync signal is monitored for indicating user inactivity or that a standby state should be entered and that the vertical sync signal is monitored along with the horizontal sync signal for indicating a return to normal. In that case, the invention monitors "any one or more" of the standard DPMS signals.

Figure 7:
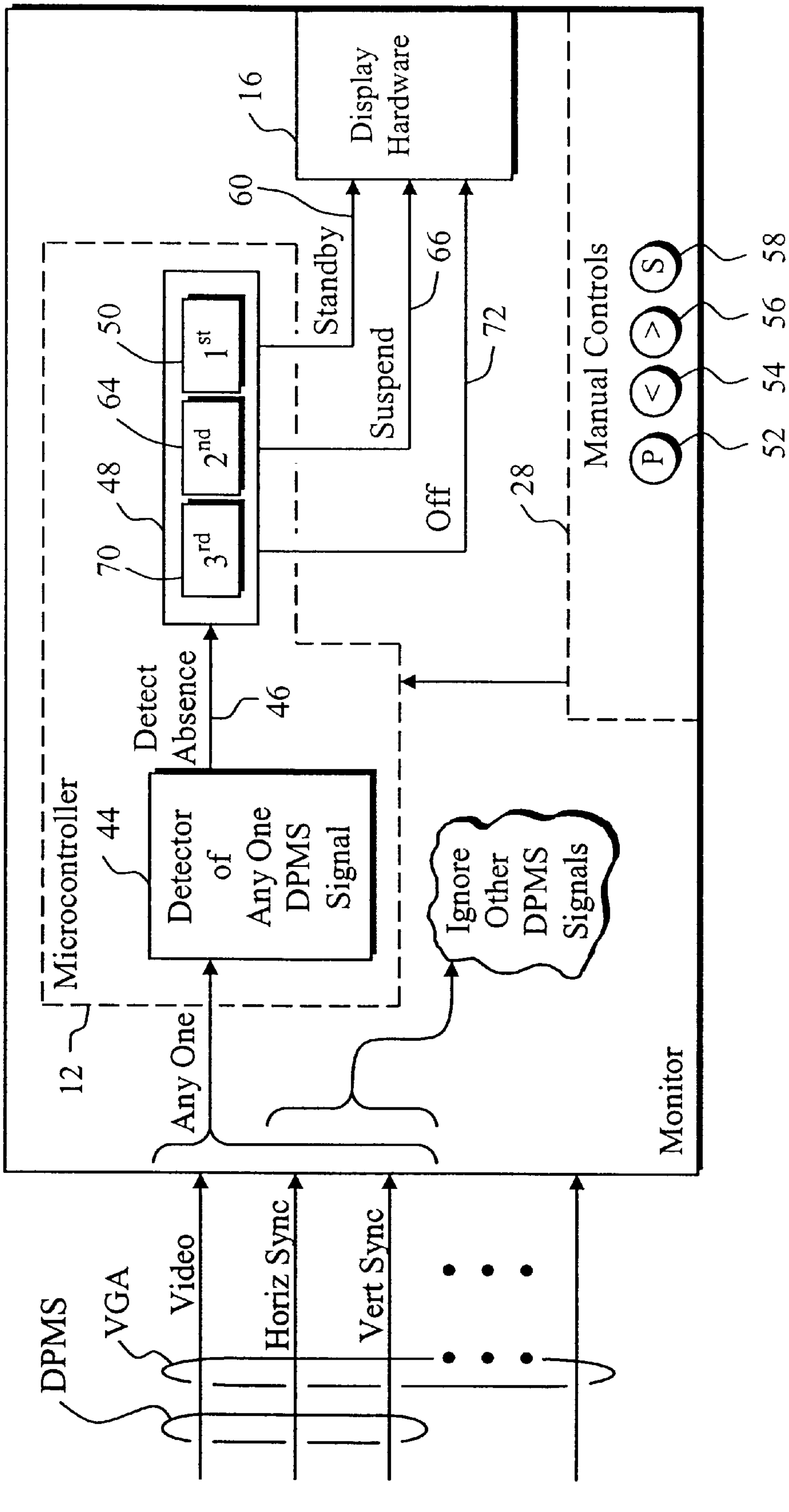
FIG. 7 is a stylized illustration of the controller 12 of FIG. 6 being used to detect user inactivity and to timeout the various energy-saving states of FIG. 6.
Figure 8A:
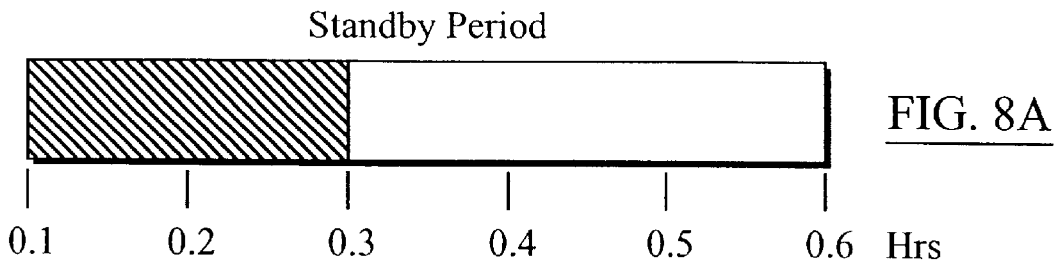
FIG. 8A shows a display monitor menu by which the user of the monitor may select a standby period using user manual controls accessible on the exterior of the monitor.
Figure 8B:
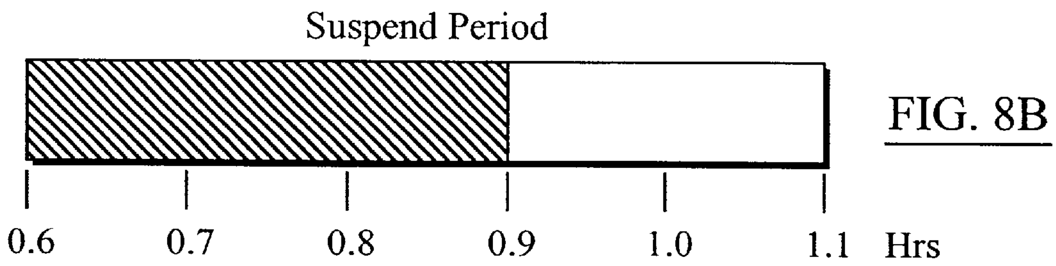
FIG. 8B shows menu selection of a suspend period using the monitor external controls.
Figure 8C:
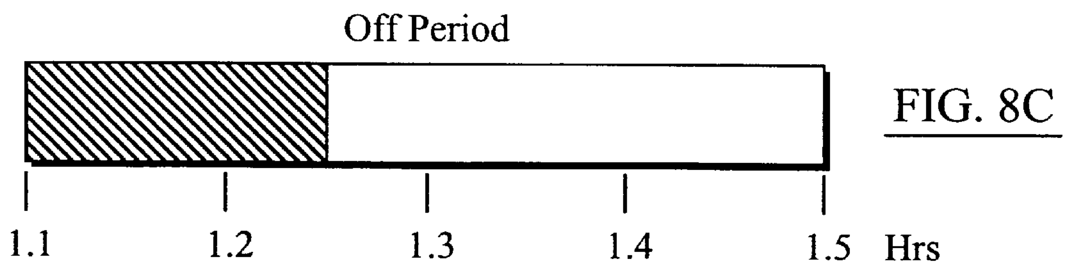
FIG. 8C shows menu selection of an off period using the monitor external controls.
Figure 9A:
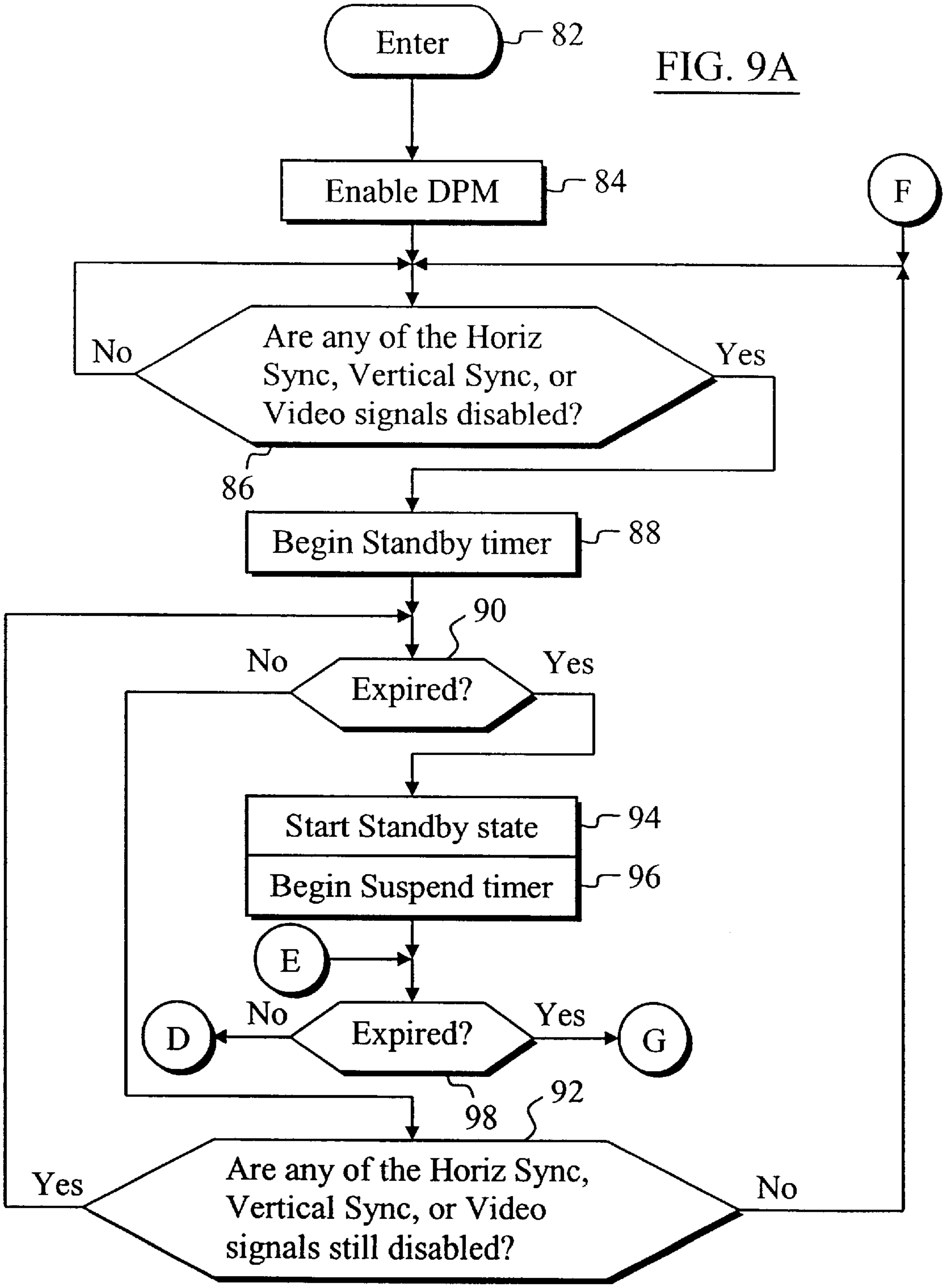
FIGS. 9A–9D show a series of steps which may be carried out in order to give a monitor the ability to execute display power management without necessarily responding to the DPMS signaling provided by a host connected thereto by a standard cable.
Figure 9B:
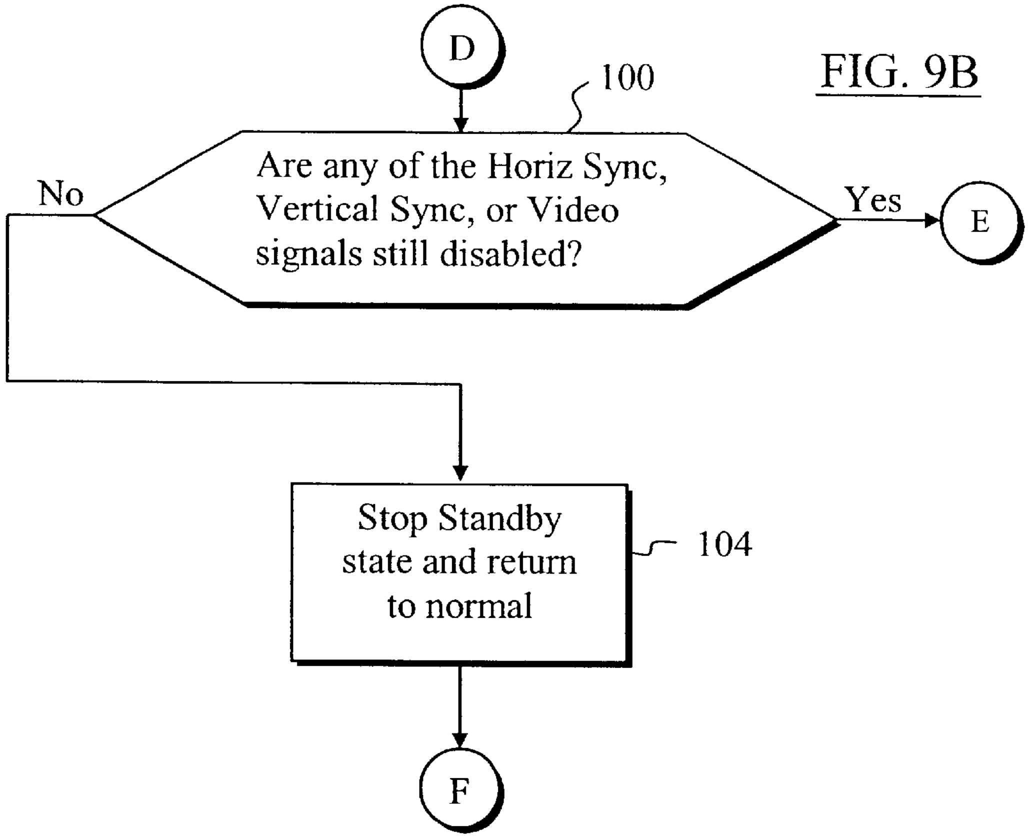
Figure 9D:
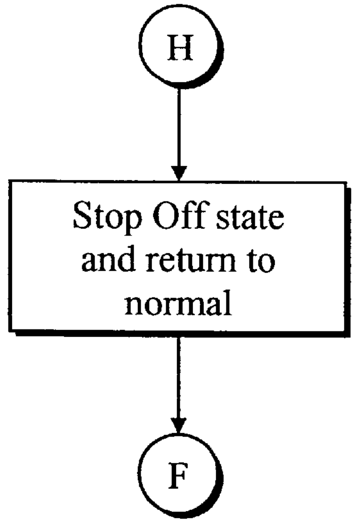
Figure 9C:
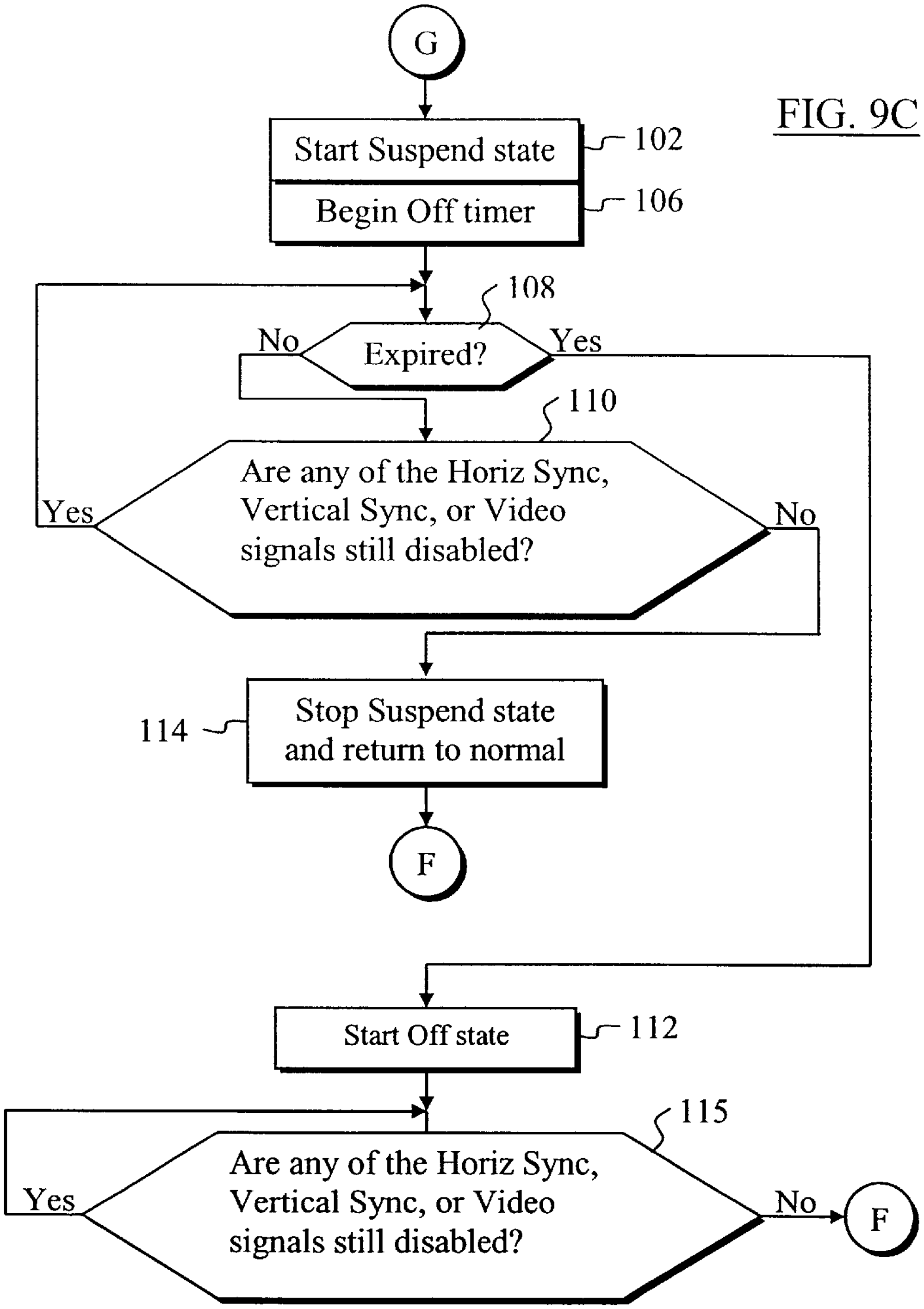

It is assumed for this embodiment that after transition from an "enter" state 40, the monitor begins operation of the display power management algorithm of the present invention in a normal state 42, from which state the algorithm waits for an indication of user inactivity, such as the detection of the video signal becoming absent. This is illustrated in FIG. 7 by the microcontroller 12 having a detector 44 within which is capable of monitoring the selected "any one" of the VGA or DPMS signals, such as the video signal, as shown. Once the video signal disappears and its absence is detected, such is signaled by a signal on a line 46 to a software timer 48, the first of a series of DPMS timers commences timing. For instance, a first timer 50 could be set by the user using manual controls 28 to 18 minutes, as shown in FIG. 8A. Such a selection would be made in the well-known manner, for instance, by pushing a button 52, after which a number of pop-up menu selections can be selected by other buttons 54, 56, until the standby period of FIG. 8A is shown on the screen. The user then selects that option by pushing a button 58, after which he can alter the standby period to vary between 0.1–0.6 hours, for instance. In the illustration of FIG. 8A, the user has selected a period of approximately 0.3 hours, or 18 minutes, before the first timer 50 will timeout and cause the controller 12 to issue a standby signal on a line 60 to the display hardware 16 which, in turn, responds by reducing power in a minimal fashion according to the DPMS standard, with a short recovery time. If such a standby signal is asserted on the line 60, the state machine of FIG. 6 will transition from the normal state 42 to a standby state 62, as indicated by a transition line 60*a*. Assuming the video signal continues to be absent and the detector 44 continues to assert the signal 46, a second software timer will then begin counting an additional period of time according to a setting by the user, as shown in FIG. 8B, such as an additional 0.3 of an hour, or an additional 18 minutes beyond the already-expired standby period. If the second timer 64 times out as well, it will cause the controller 12 to issue a suspend signal on a line 66 to the display hardware 16, which will then respond by substantially reducing the power consumed by the monitor with a longer recovery time. This corresponds in FIG. 6 to a transition from the standby state 62 to a suspend state 68, as indicated by a transition line 66*a*. A third software timer 70 may then commence timing a third period as selected by the user, as shown in FIG. 8C, for instance, at 1.25 hours after the first detection of the absence of user activity indicated on the line 46. In other words, the third timer will be timing another 0.35 hours after the suspend timeout period. Once the third software timer 70 times out after 1¼ hours, an off signal is provided on a line 72 to the display hardware 16 which responds by initiating an off state in which power savings are maximum and recovery time is system dependent, according to the VESA DPMS standard. This is indicated in FIG. 6 by a transition from the suspend state 68 to an off state 74 via a transition line 72*a*.

It should be mentioned that after transitioning from the normal state to any of the other display power management states shown in FIG. 6, if at any time the signal on the line 46 ceases to detect the absence of user activity, i.e., if user activity begins again, then a transition will immediately be made back to the normal state 42, as indicated by transition lines 76, 78, 80 of FIG. 6. If, after transitioning from the suspend state 68 to the off state 74, user activity continues to be non-existent, then the display hardware will remain in the off state indefinitely, thus saving power by the maximum amount without turning the display completely off. It is, of course, always possible that the user may at any time completely remove power from the display by simply switching the power switch off. In other words, the off state 74 of FIG. 6 is not necessarily completely off, with absolute zero power. There may still be a small amount of power sufficient to run the microcontroller 12, the interface and other circuitry necessary to continue with various low-level functions, including display power management.

It should be realized that the state machine of FIG. 6 can be implemented in many different ways. For instance, the present invention may be implemented by writing code according to the flowchart of FIGS. 9A, 9B, 9C and 9D, which will now be described. After entering in a step 82 shown in FIG. 9A, the display power management (DPM) algorithm of the present invention is enabled in a step 84. A step 86 is next executed to determine if the signal indicative of user activity is disabled, e.g., a selected one of the DPMS signals, such as the video signal. If it is not disabled, then the step 86 is executed repeatedly until such a disablement is detected. Once detected, a step 88 is next executed in order to start the first software timer 50. A step 90 determines if the standby timer has expired or not, and if not, a step 92 is executed to find out if, for instance, the signal on the line 46 is still indicating the absence of user activity. If so, the steps 90, 92 are re-executed repeatedly until the standby timer expires. If the step 92 determines that user activity has recommenced, the flowchart returns to repeated execution of the step 86 until user inactivity is once again detected.

Assuming the standby timer expires, the standby signal on the line 60 is asserted by entering a standby state similar to the standby state 62 of FIG. 6, as indicated by a step 94 and starting the suspend software timer 64 of FIG. 7. A step 98 is then executed to determine if the suspend timer has expired yet. If not, a transition is made to the flowchart steps illustrated in FIG. 9B, where a step 100 is executed to find out if user inactivity still prevails. If so, the steps 98, 100 are re-executed repeatedly until the suspend timer times out, after which a transition is made to the flowchart steps of FIG. 9C, where it is indicated in a step 102 that the suspend state, which may be similar to the suspend state 68 of FIG. 6, is started. This would also correspond to the suspend signals on the line 66 of FIG. 7 being asserted. If, during any of the repeated executions of the step 100, it is determined that user inactivity no longer prevails, then a step 104 is executed to transition from the standby state back to the normal state, such as the transition shown by the transition line 76 of FIG. 6 from the standby state 62 to the normal state 42. This would also cause the flowchart to transition back to the steps of FIG. 9A, where the step 86 would then be executed repeatedly until user inactivity were once again detected.

Referring back to FIG. 9C, assuming user inactivity still prevails, after starting the suspend state, a step 106 is next executed to begin the software off timer 70 of FIG. 7. A pair of steps 108, 110 are then executed repeatedly until the off timer expires, followed by execution of a state 112 starts the off state, such as the off state 74 of FIG. 6. If, during the repeated executions of the steps 108, 110, it is determined that user activity has recommenced, a step 114 is executed to stop the suspend state and to transition to the normal state, such as indicated by the transition line 78 of FIG. 6. A return is then made to the flowchart steps of FIG. 9A, where the step 86 is executed repeatedly until user inactivity is once again detected.

Referring back to FIG. 9C, after the off state is started in the step 112, a step 115 is executed to determine if user inactivity persists. If so, step 115 is re-executed repeatedly. This corresponds to the state machine of FIG. 6 remaining in the off state 74 indefinitely. If, on the other hand, it is determined during any of the subsequent re-executions of the step 115, that user activity has recommenced, a transition is made, as indicated by the transition line 80 of FIG. 6 to the normal state. This corresponds in FIG. 9C to stopping the repeated execution of the step 114 and transitioning to the flowchart of FIG. 9A, where repeated execution of step 86 is recommenced until user activity is once again detected by the detector 44 of FIG. 7.

As will be evident to any person of skill in the art from the foregoing, the present invention may be carried out in any number of different ways, according to the teachings hereof, the specific examples being merely illustrative.

It should be realized that although the above description relating to FIG. 6 and FIGS. 9A–9D has included the concept of starting at a normal state and only transitioning to a standby state after a timeout period beginning after the indication of the loss of a video signal, such a signaling from the host, according to the DPMS standard, might itself be an indication that a standby state should be entered into directly without any necessity for timing from a normal state to a standby state, such already having been done in the host. Therefore, it should be realized that the above description of the state machine and the series of steps for carrying out same could be truncated to combine the normal state with the standby state, and have the transition therefrom directly to the suspend state after a suspend timeout period. Or, as above, a second standby timeout could even be carried out in the monitor. In the case where user activity/inactivity is derived from a source other than DPMS signaling, such as a motion detector, it is preferable to include a standby timer.

Thus, although the invention has been shown and described with respect to a best mode embodiment thereof, it should be understood by those skilled in the art that the foregoing and various other changes, omissions and additions in the form and detail thereof may be made therein without departing from the spirit and scope of the invention.

What is claimed is:

1. Display power management method, comprising the steps of:

monitoring at a display a signal indicative of user activity; and timing within said display, for so long as said signal indicates user inactivity, successive periods of user inactivity, for initiating a corresponding series of successively greater power saving states, each of which terminates to a normal power consuming state upon detection of resumption of user activity as indicated by said signal, wherein said step of monitoring comprises the steps of:

repeatedly detecting in said display for the absence of any one of a plurality of signals provided to the display from a host computer over a standard interface cable for signaling various display power management states; and wherein said step of timing comprises the steps of:

upon first detecting the absence of said any one of said plurality of signals while in a normal operating state, commencing a timing procedure while continuing to detect for said absence of said any one of said plurality of signals, whereby after a number of timeout periods energy consumption of said display is reduced in a comparable number of energy-saving operating states; and returning to said normal operating state upon no longer detecting said absence of said any one of said plurality of signals.

2. The method of claim 1, wherein said number of energy-saving operating states includes a standby state with minimal power savings, a suspend state with substantial power savings, and an off state with maximum power savings.

3. The method of claim 1, wherein upon said first detecting the absence of said any one of said plurality of signals, transitioning after a standby timeout period from a normal operating state of said display to a standby operating state with minimal power savings, starting a suspend timeout period upon transitioning to said standby operating state, transitioning after said suspend timeout period to a suspend operating state, starting an off timeout period upon transitioning to said suspend operating state, transitioning after said off timeout period to an off operating state.

4. The method of claim 1, wherein said power saving states are timed in response to user inputs via on-screen menu control.

5. Monitor having a controller for receiving standard signals from a host computer for displaying information with display hardware, said monitor further comprising:

a detector for detecting absence of any one of a plurality of display power management signals among said standard signals from said host computer; and a timer for timing transitions to a plurality of energy-saving states subsequent to said detecting the absence of said any one of the plurality of display power management signals for providing state transition timeout signals, wherein said display hardware is responsive to said state transition timeout signals for transitioning to said plurality of energy-saving states.

6. The monitor of claim 5, further comprising manual controls for user selection of timeout periods for said timing of said transitions to said plurality of energy-saving states.

7. The monitor of claim 6, wherein said manual controls comprise on-screen menu controls for user selection of said timeout periods.

8. Display power management apparatus, comprising:

means for monitoring at a display a signal indicative of user activity by repeatedly detecting in said display the absence of any one of a plurality of signals provided to the monitor from a host computer over a standard interface cable for signaling various display power management states; and means for timing within said monitor for so long as said signal indicates user inactivity, successive periods of user inactivity, for initiating a corresponding series of successively greater power saving states, each of which terminates to a normal power consuming state upon detection of resumption of user activity as indicated by said signal, wherein upon first detecting the absence of said any one of said plurality of signals while in a normal operating state, commencing a timing procedure while continuing to detect for said absence of said any one of said plurality of signals, whereby after a number of timeout periods energy consumption of said display is reduced in a comparable number of energy-saving operating states and returning to said normal operating state upon no long detecting said absence of said any one of said plurality of signals.

9. The apparatus of claim 8, wherein said number of energy-saving operating states includes a standby state with minimal power savings, a suspend state with substantial power savings, and an off state with maximum power savings.

10. The apparatus of claim 8, wherein upon said first detecting the absence of said any one of said plurality of signals, transitioning after a standby timeout period from a normal operating state of said display to a standby operating state with minimal power savings, starting a suspend timeout period upon transitioning to said standby operating state, transitioning after said suspend timeout period to a suspend operating state, starting an off timeout period upon transitioning to said suspend operating state, transitioning after said off timeout period to an off operating state.

11. The apparatus of claim 8, wherein said power saving states are timed in response to user inputs via on-screen menu control.

* * * * *